Sept. 19, 1944.　　　A. E. SMITH　　　2,358,421
CONTAINER LOADING APPARATUS
Filed Sept. 25, 1942　　　8 Sheets-Sheet 1

INVENTOR.
ARTHUR E. SMITH
BY
ATTORNEY

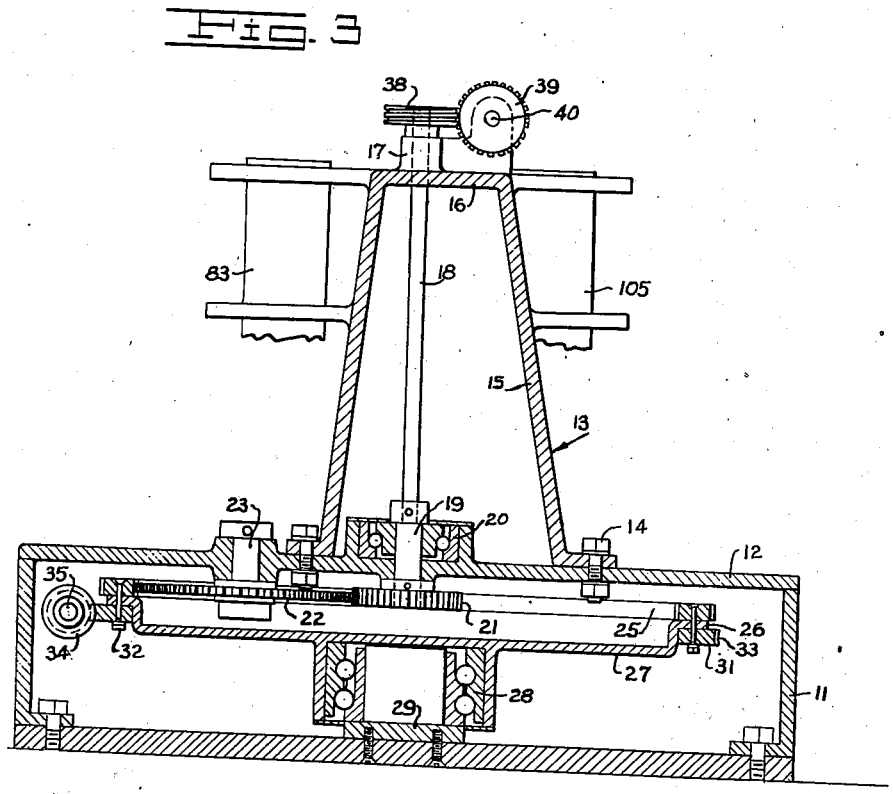
Fig. 3
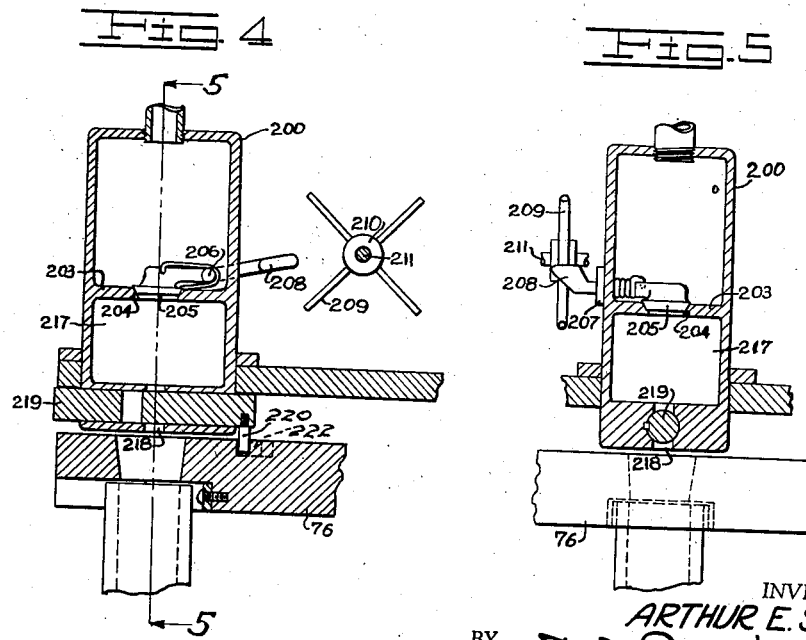
Fig. 4
Fig. 5
INVENTOR.
ARTHUR E. SMITH
BY
ATTORNEY

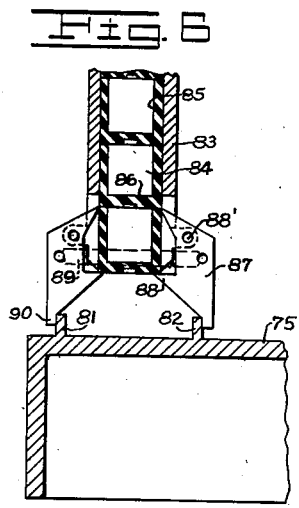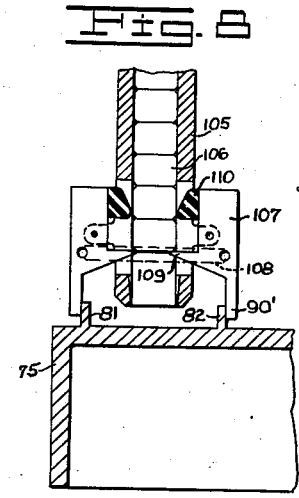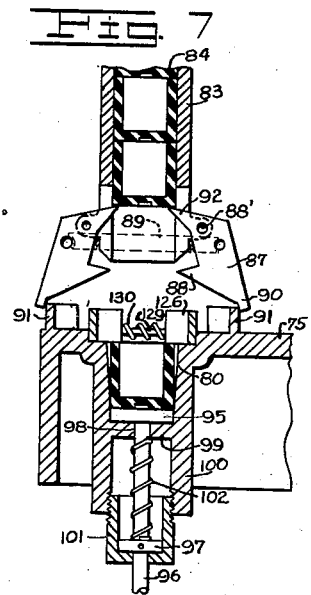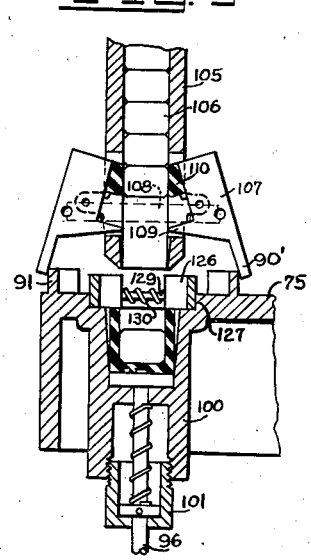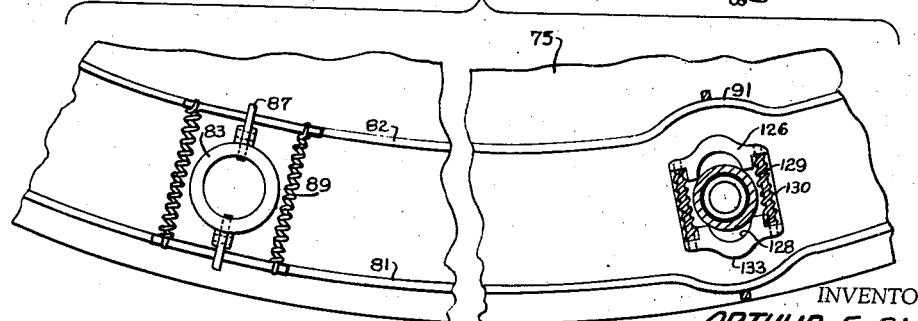

Sept. 19, 1944.   A. E. SMITH   2,358,421
CONTAINER LOADING APPARATUS
Filed Sept. 25, 1942   8 Sheets-Sheet 5
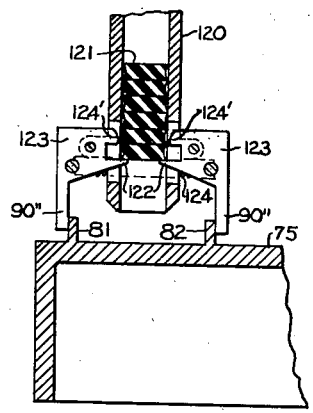
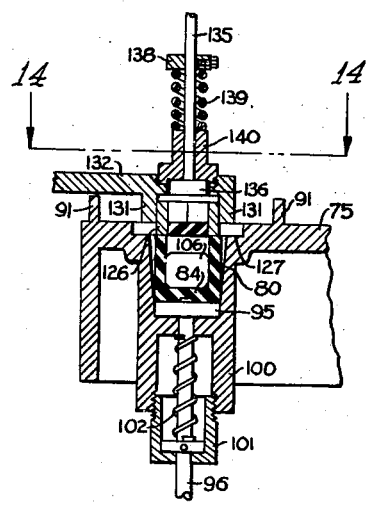
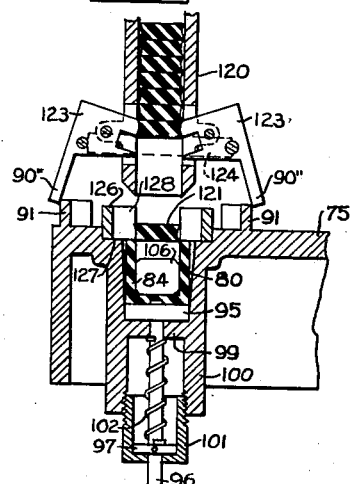
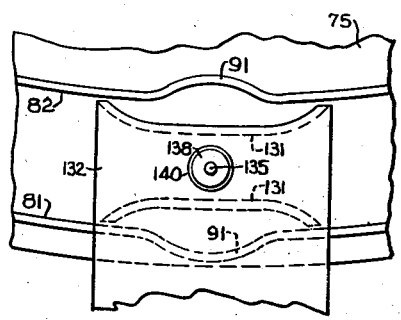
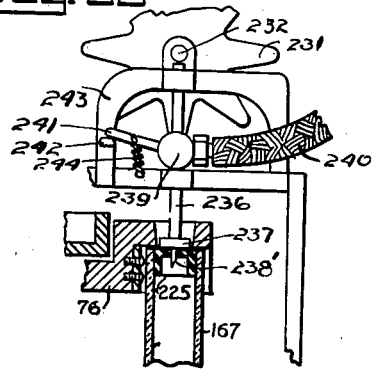
INVENTOR.
ARTHUR E. SMITH
BY
ATTORNEY Sept. 19, 1944.  A. E. SMITH  2,358,421
CONTAINER LOADING APPARATUS
Filed Sept. 25, 1942    8 Sheets-Sheet 6
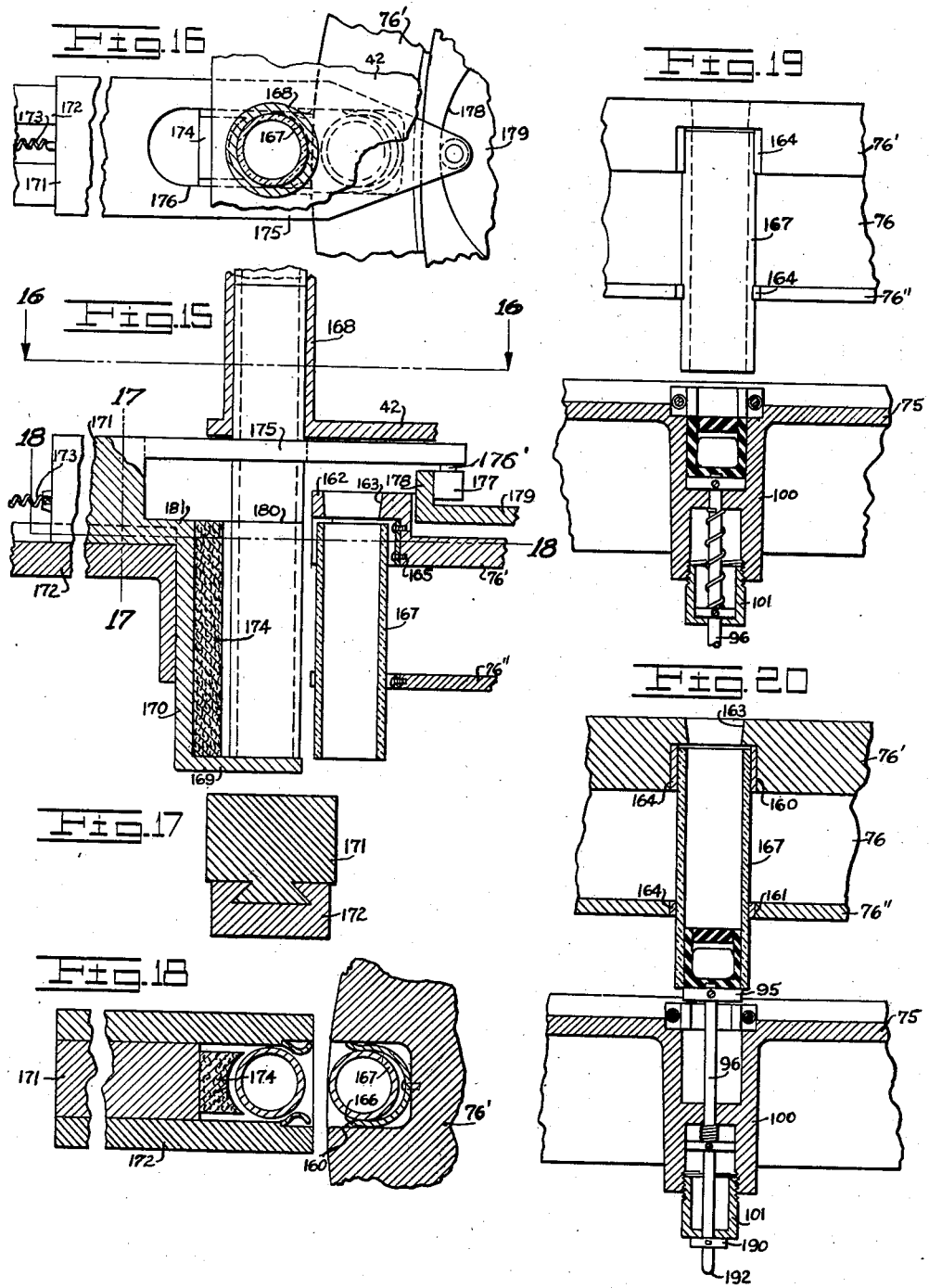
INVENTOR.
ARTHUR E. SMITH
BY
ATTORNEY Sept. 19, 1944.   A. E. SMITH   2,358,421
CONTAINER LOADING APPARATUS
Filed Sept. 25, 1942   8 Sheets-Sheet 7
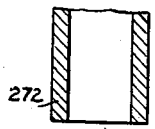
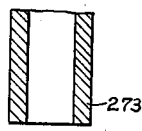
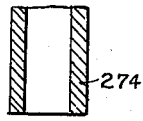
FIG 24
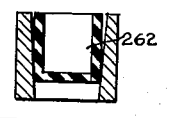
FIG 25
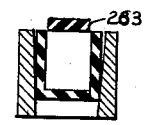
FIG 26
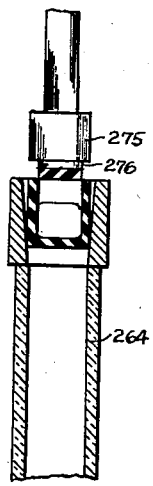
FIG 27
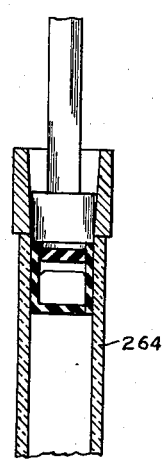
FIG 28
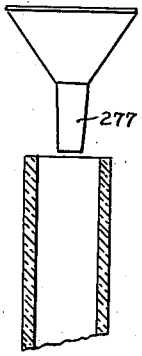
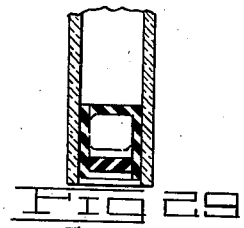
FIG 29
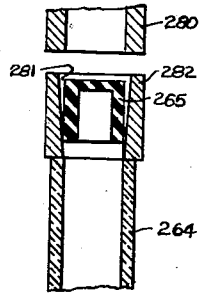
FIG 30
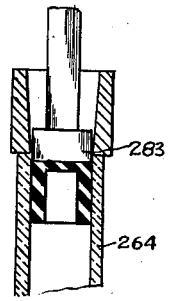
FIG 31
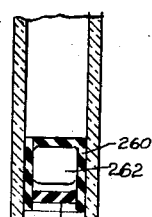
FIG 32
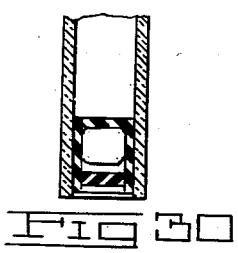
INVENTOR.
ARTHUR E. SMITH.
BY
ATTORNEY

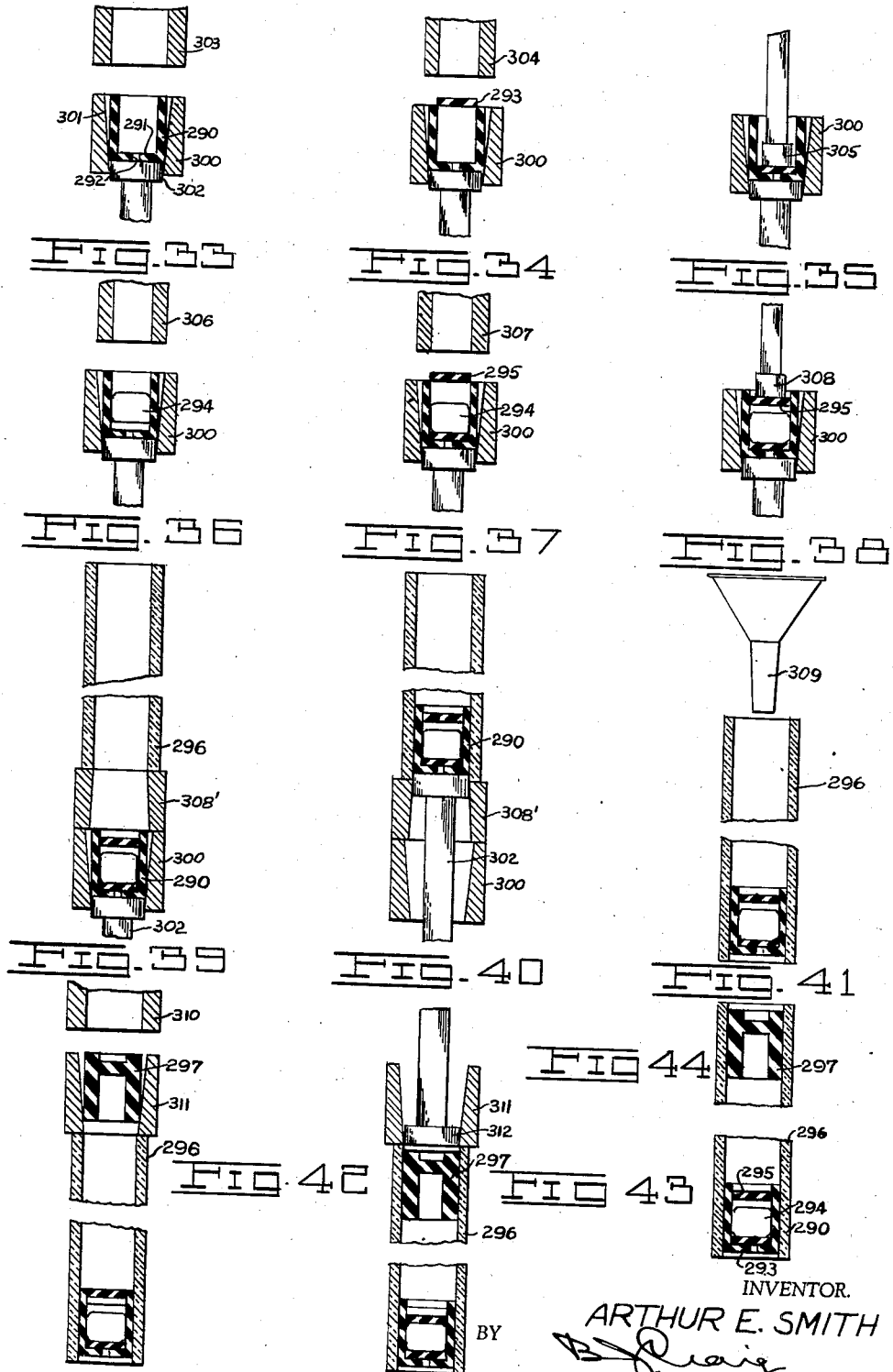

Patented Sept. 19, 1944

2,358,421

UNITED STATES PATENT OFFICE 2,358,421

CONTAINER LOADING APPARATUS

Arthur E. Smith, Los Angeles, Calif.

Application September 25, 1942, Serial No. 459,733

26 Claims. (Cl. 226—1)

This invention relates to container loading apparatus.

The general object of the invention is to provide a novel apparatus for placing corks and a liquid into a cylindrical container.

Another object of the invention is to provide a novel means for placing a cork in a container.

A further object of the invention is to provide a novel container apparatus for placing a medicinal preparation in a compartmental cork.

Another object of the invention is to provide a novel apparatus for placing a closure in a compartmental cork.

An additional object of the invention is to provide a novel apparatus whereby a medicinal preparation is inserted into a container and wherein photo-electrically operated means indicates a failure of the apparatus to advance the medicinal preparation into place.

A further object of the invention is to provide novel means for filling an ampule.

An additional object of the invention is to provide a novel rotary member mounted to move to stations and wherein at successive stations a cork is supplied to the member, a tablet placed in the cork, a closure placed in the cork and the cork thereafter is discharged into an ampule.

A further object of the invention is to provide a novel apparatus including a rotary member and with stations disposed about the rotary member to first feed an ampule to the member, then place a cork in the ampule and then fill the ampule, place a cork in the other end of the ampule and to finally discharge the ampule.

An additional object of my invention is to provide a novel method of loading a stopper and/or a container.

Other objects and advantages of my invention will be apparent from the following description taken in connection with the accompanying drawings, wherein:

Fig. 3 is a section taken on line 3—3 of Fig. 1;

Fig. 4 is an enlarged vertical section through one of the filling valves;

Fig. 5 is a central sectional view of the valve shown in Fig. 4 taken on line 5—5, Fig. 4;

Fig. 6 is an enlarged fragmentary vertical section through the stopper hopper showing the release arms closed;

Fig. 7 is a view similar to Fig. 6 showing the release arms open and the stopper in its cavity;

Fig. 8 is an enlarged fragmentary vertical section through the medicinal pellet hopper showing the release arms closed;

Fig. 9 is a view similar to Fig. 8 showing the release arms open and a pellet delivered into the stopper;

Fig. 9A is a fragmentary sectional view showing the photo-electrically operated signal member for the pellet hopper;

Fig. 10 is an enlarged fragmentary top plan view partly in section showing the stopper receiving table;

Fig. 11 is an enlarged fragmentary vertical section through the disc closure hopper showing the release arms closed;

Fig. 12 is a view similar to Fig. 11 showing the release arms open and one of the disc closures delivered;

Fig. 13 is a view similar to Fig. 12 but at the station where the compressor mechanism has compressed the disc closure;

Fig. 14 is a fragmentary section on line 14—14, Fig. 13;

Fig. 15 is a fragmentary enlarged section taken on line 15—15, Fig. 2;

Fig. 16 is a fragmentary section taken on line 16—16, Fig. 15;

Fig. 17 is a section taken on line 17—17, Fig. 15;

Fig. 18 is a fragmentary section taken on line 18—18, Fig. 17;

Fig. 19 is an enlarged sectional detail showing aligned tables with the upper table in elevation and the lower table in section;

Fig. 20 is a view similar to Fig. 19 showing the medicinal stopper being inserted into an ampule;

Fig. 21 is a fragmentary sectional detail showing the piston closure stopper hopper and feed means;

Fig. 22 is a fragmentary detailed view partly in section showing the piston closure inserting means;

Fig. 23 is an end view showing the parts of Fig. 22;

Figure 1:
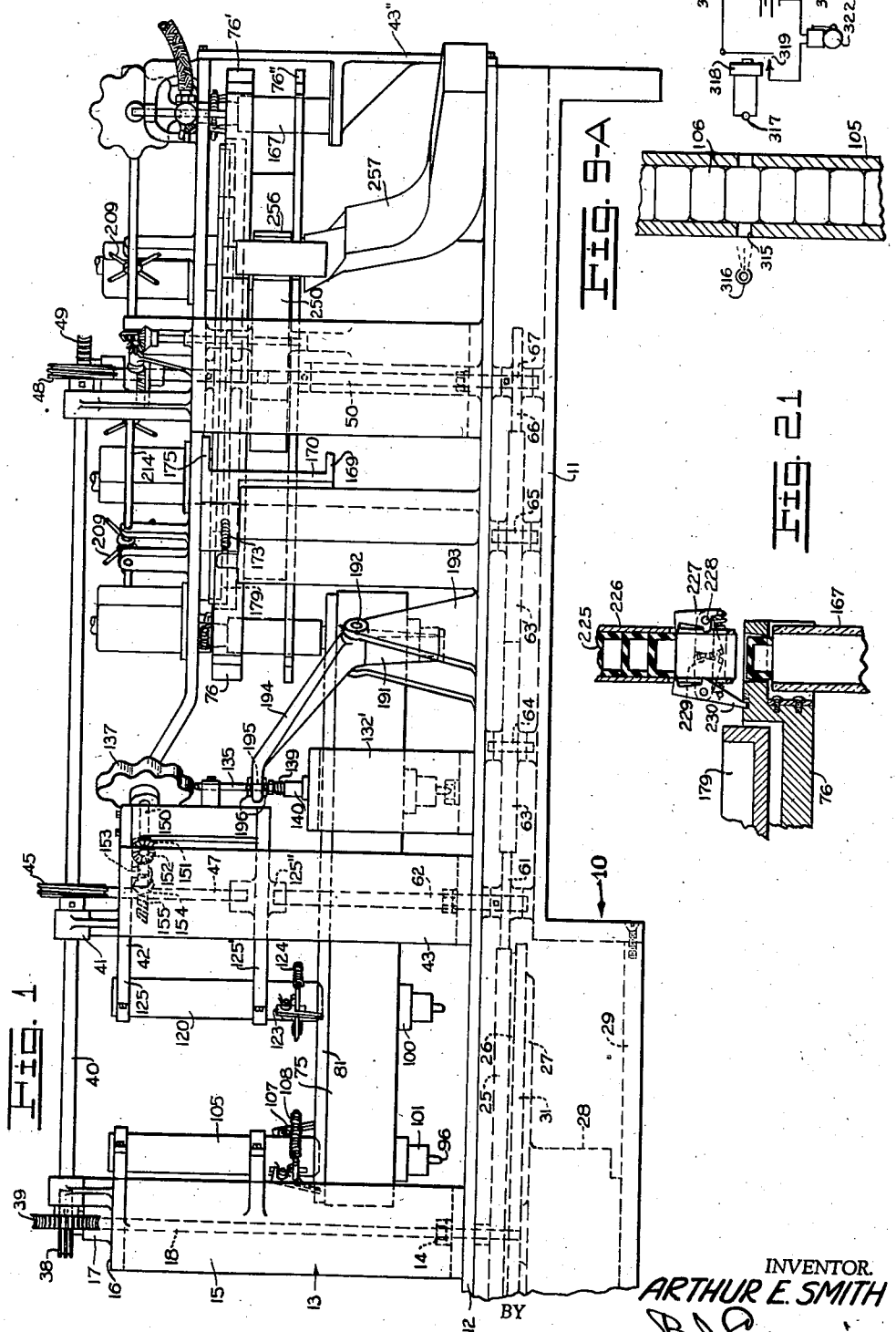
Fig. 1 is a side elevation showing my novel container loading apparatus.

Figs. 24 to 32 inclusive are diagrammatic views showing a modified apparatus and method; and Figs. 33 to 44 inclusive are diagrammatic views showing a further modified apparatus and method.

Referring to the drawings by reference characters I have shown my invention as embodied in an apparatus which is indicated generally at 10.

As shown, the apparatus includes a base 11 having a platform 12 thereon. Mounted on the platform I show a support frame 13 held in place by bolts 14. The support frame 13 includes legs 15 and a top 16 with a boss 17 extending above the top.

The boss 17 is bored to receive a shaft 18 which extends downwardly and includes an enlarged lower portion 19 supported in a bearing 20. The lower portion 19 has a spur gear 21 thereon which is driven from an idler gear 22 supported on a shaft 23. The gear 22 is driven by teeth 24 on the inner face of a ring gear 25.

The ring gear 25 is mounted on the top of flange 26 on a disc 27 which is supported in a bearing 28. The bearing 28 is supported on a plate 29 on the base. The under face of the flange 26 is engaged by a ring gear 31. The ring gears 25 and 31 are secured to the flange 26 by bolts 32.

The ring gear 31 includes external teeth 33 which are engaged by a worm wheel 34 mounted on a shaft 35. The shaft 35 is driven from a suitable source of power such as a motor 36. The teeth 24 on the ring gear 25 (see Fig. 2) are arranged in interrupted sets so that when the ring gear 25 rotates the teeth 24 of one set will mesh with the teeth on the gear 22 for a time, after which a blank space 37 on the ring gear 24 will be opposite the teeth on the gear 22 so that as a result the gear 22 will be intermittently driven when the gear 25 rotates continuously.

The shaft 18 which is intermittently driven as just described has a worm gear 38 disposed above the boss 17 and this drives a companion gear 39 mounted on a shaft 40. The shaft 40 is supported in suitable bearings 41 arranged on a cover member 42 which includes depending side portions 43 and 43' and on end portion 43" suitably mounted on the platform 12, one end of the cover 42 is above the level of the other portion of the cover.

The shaft 40 drives a gear 45 which in turn drives a gear 46 (Fig. 2) on a vertical shaft 47. The shaft 40 also drives a gear 48 which in turn drives a gear 49 on a vertical shaft 50. The shafts 47 and 50 drive mechanisms which will be presently described.

Figure 2:
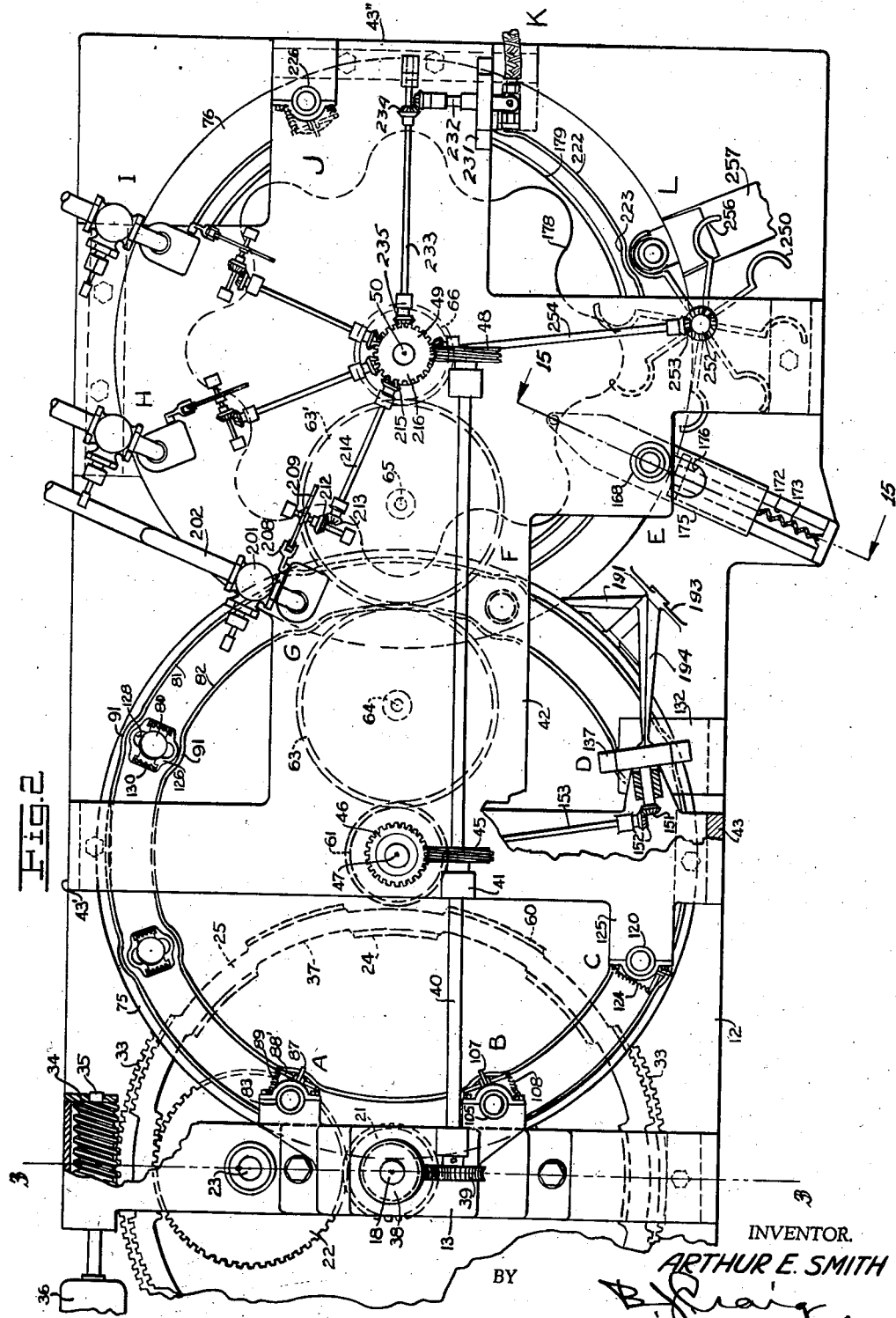
Fig. 2 is a top plan view of the device shown in Fig. 1.

The ring gear 25 has external teeth 60 thereon which are arranged in interrupted sets as shown in Fig. 2. The teeth 60 drive a gear 61 mounted on a shaft 62 which aligns with the shaft 47. The gear 61 meshes with a train of idler gears 63 and 63' mounted on shafts 64 and 65 respectively. The gear 63' drives a gear 66 mounted on the shaft 67. The shaft 67 is aligned with the shaft 50 previously described. The teeth 24 and 60 are so arranged that most of the time the shafts 47 and 50 are turning the shafts 62 and 62 and 67 will be idle, and vice versa.

The shaft 62 supports and drives a table 75 which is disposed above the top 12. The shaft 67 supports and drives a table 76 which is arranged above and which slightly overlaps the table 75. The overlapping relation is shown in Fig. 2 and the construction is such that the two tables 75 and 76 are simultaneously moved with the overlapping portions moving in the same direction and at the same rate of speed.

The apparatus includes a plurality of stations at which various steps in the loading operation occur. The apparatus disclosed is primarily intended for loading ampules which contain medicinal preparations placed in corks. The ampules are elongated cylindrical containers and a cork is placed in each end of the ampule. One of the corks serves as a piston cork to force the contents from the ampule. One of the corks is provided with a cavity which holds a medicinal preparation, the latter being released into a liquid in the ampule to prepare a fresh solution.

The table 75 is provided with a plurality of cavities 80 arranged in spaced relation and disposed adjacent the periphery of the table. The table on its top surface is provided with an outer and inner cam surfaces 81 and 82 which are preferably of the configuration shown in Fig. 2.

In Figs. 6 and 7 I show station A and a portion of the table 75. Above the table I arrange a hopper 83 in which corks 84 are arranged to slide downwardly. These corks are made of rubber or similar material and include side walls 85 and a lower wall 86. The corks are held in place in the hopper 83 by arms 87 which are suitably supported on pivots 88' mounted on the hopper. Each arm includes an inwardly directed tooth portion 88 which engages the lower face of the lowermost cork and normally prevents the downward movement of the corks. A spring 89 normally holds the arms together. The arms 87 include downwardly extending ears 90 which engage the cam tracks 81 and 82. The cam tracks 81 and 82 include active portions 91 (Fig. 2) aligned with the apertures 80 as shown in Figs. 6 and 7.

The hopper 83 is secured to the support frame 13 and as the table 75 rotates the cam portions 91 move the ears 90 outwardly, thus separating the teeth 88 and freeing the lowermost cork to permit it to drop into the associated cavity 80. This operation is indicated in Fig. 7. The arms 87 each further include a jaw 92. These jaws move inwardly when the teeth 88 move outwardly and move beneath the second cork in the hopper and thus hold this second cork until the active cam portion 91 is passed, whereupon the springs 89 pull the arms 87 together and as the superimposed corks in the hopper 83 move downwardly the lowermost cork engages the teeth 88 on the arms 87. Thus each time a cavity 80 moves beneath the hopper a cork is dropped into the cavity.

The cavities 80 are provided with tapering walls 81, thus allowing the corks to move well into the cavities and to seat upon the head 95 of a plunger 96 which includes a collar 97 and which passes through an aperture 98 in a partition 99 in a wall 100 which defines the cavity 80. A threaded closure 101 engages the lower portion of the wall 100 and is in turn engaged by the collar 97 which is pinned to the plunger 96. A spring 102 normally urges the collar 97 downwardly.

In Figs. 8 and 9 I show station B wherein medicinal tablets are inserted into the stopper. As shown this station includes a hopper 105 in which pellets 106 are arranged to slide. The hopper is supported on the frame 13 and includes a pair of arms 107 similar to the arms 87 previously described insofar as their mounting and operation are concerned. The arms are pulled together by springs 108 and include depending ears 90' similar to the ears 90 previously described which are spread apart by the cam portions 91, thus moving teeth 109 from the lowermost pellet. The upper portion of each arm 107 includes a soft rubber pad 110 which moves inwardly and engages the next to the lowermost pellet and holds this pellet until the cam portion 91 is passed. The pads 110 prevent crushing of the pellet during the loading operation.

The construction is such that each time a cavity 80 appears below the hopper 105 a tablet is dropped into the cork in the cavity.

Station C at which closure corks are inserted in the stopper is shown in Figs. 11 and 12. As shown, this station C includes the hopper 120 in which resilient closure discs 121 are arranged. The lowermost disc is engaged by teeth 122 on arms 123 similar to the arms 87 and urged together by springs 124. Ears 90'' engage the cam tracks 81 and 82 and urge the arms outwardly, thus moving the teeth 122 from the lowermost disc and moving jaws 124' inwardly to support the second disc in the hopper 120. The hopper 120 is supported on a portion 125 of the cover member 42 and on a plate 125' which is parallel to the portion 125 and which is secured to the side portions 43. The plate 125' also has bosses 125'' thereon which support the shafts 47 and 62.

The construction is such that when one of the cavities 80 is below the hopper 120 a disc 121 is dropped upon the top of the hollow cork in the associated cavity.

At station D as shown in Figs. 13 and 14 the disc 121 is forced into the stopper 84 to confine the tablet 106 in place. In order to correctly position the disc 121 which has an external maximum diameter slightly greater than the internal diameter of the cork 84 (as shown in Fig. 12) it is desirable to first compress the disc 121 and then force the disc from the compressing means into the stopper.

To compress the disc 121 I provide the table 75 about each cavity 80 with a pair of clamping guides 126 (best shown in Fig. 10) which are seated in a recess 127 about the cavities 80. The clamping guides are complemental and each includes an internal semi-cylindrical recess 128. The clamping guides slide on guide rods 129 with a spring 130 on each guide rod and urging the clamping guides apart. The walls of the recess 127 limit the separating movement of the clamping guides which are held apart sufficiently by the springs 130 to permit the stopper to pass between them.

The clamping guides are urged together at station D by cam tracks 131 (see Fig. 14) which depend from a plate 132 which is supported on a bracket 132'. This plate extends over the table 75 and over the outer cam track 81 and the depending members 131 engage bosses 133 on the clamping guides 126 and force these guides inwardly so that the cavities 128 compress the cork 121 to a diameter slightly smaller than the interior diameter of the stopper 84.

At station D I provide a plunger member 135 which includes a head 136 which passes through a hole in the plate 132. The plunger member 135 is moved downwardly by a cam member 137 and as it moves downwardly it forces the closure 121 into the upper portion of the cork 84. The plunger 135 is provided with a collar 138 (Fig. 1) and with a spring 139 which engages the collar 138. The spring 139 also engages a guide member 140 which engages the member 132. Thus the plunger 135 is normally urged upwardly. The throw of the cam 135 is such as to correctly position the closure 121 in the stopper 84.

The cam 137 is mounted on a shaft 150 which is driven by a bevel gear 151 from a bevel gear 152 on a shaft 153. The shaft 153 is in turn driven by a bevel gear 154 from a bevel gear 155 on the shaft 47 previously mentioned. This shaft 47 rotates at a time when the table 75 which is driven by the shaft 62 is at rest. The relation of gears 155, 154, 152 and 151 is such that the cam 137 will move one notch each time the table 75 comes to rest.

It will thus be seen that at station D the cork 184 is loaded with the tablet 106 and the closure 121 is placed therein. The next step is to place the loaded stopper 84 in one end of an ampule.

The ampule is conveyed to the loading position by the table 76 which includes an upper portion 76' and a lower portion 76'' and each table portion is provided with aligned, spaced, outwardly opening slots 160 and 161 respectively. The portion 76' includes an offset peripheral portion 162 (Fig. 15) which has tapered holes 163 therein which are aligned with the slots 160 and 161.

The recesses 160 and 161 are each provided with springs 164 shown as held in place by screws 165. The springs are generally U-shaped and include lips 166 which engage an ampule 167 disposed in the recesses 160 and 161 and serve to hold the ampule during its loading operation.

The recesses 160 and 161 are so disposed that they move step by step with the apertures 80 in the table 75 and where the tables 75 and 76 overlap the slots 160 and 161 will be aligned with the apertures 80.

The station for loading the ampules on to the table 76 is indicated at E. The ampule hopper is indicated at 168 and is supported on the cover 42. The ampules 168' are inserted in the top of the hopper and are free to slide downwardly therein. The ampule loading station is shown in Figs. 15, 16, 17 and 18 where it will be noted that the hopper 168 aligns with a platform 169 on which the lowermost ampule 167 in the hopper rests. This platform 169 is attached by an arm 170 with a slide 171 which slides in a way 172 which is fixedly mounted. A tension spring 173 normally urges the slide 171 to the left in Fig. 13. The front of the arm 170 has a resilient pad or cushion 174 thereon.

The slide 171 includes a projecting portion 175 which is slotted as at 176 (Fig. 16) and the forwardly extending portion 175 includes a downwardly directed shaft 176' on which a roller 177 is mounted. The roller 177 engages a flange 178 on a cam disc 179. The flange 178 is sinuous as shown in Fig. 2, and the disc 179 is mounted on and driven by the shaft 50 in step by step motion. Thus the slide 171 is reciprocated and as it moves inwardly the pad 174 engages the lowermost ampule whose upper end 180 is flush with the top of the arm 170. The pad pushes the ampule to the right in Fig. 13 until it is engaged by the lips 166 of the springs 164. The next to the lowermost ampule in the hopper 161 rests on a shoulder 181 on the slide 171 while the ampule is being pushed forward and when the slide returns and clears the bottom of the second ampule this ampule will move downwardly and will engage the platform 169 on the arm 170 and thus be in position to be advanced into engagement with another pair of springs 166.

At station F the stopper in the cavity in the table 75 is pushed into the ampule in the adjacent recess in the table 76. This station is shown in Figs. 19 and 20 with the ampule 168' disposed above the stopper which has a medicinal pellet therein. When the plunger 96 is operated the head 98 thereon is moved upwardly against the action of the spring 102 until a collar 190 on the plunger 96 engages the lower face of the closure 101. The plunger 96 is moved upwardly by one end of a rocker arm 191 which engages the lower end 192 of the plunger. The arm 191 is mounted on a shaft 192 (Fig. 1) with the shaft mounted on a bracket 193 on the platform 12. The other end of the arm extends as at 194 towards the plunger 135 and is provided with a recess 195 through which the plunger 135 extends. Spaced collars 196 on the plunger 135 cause the arm 194 to move up and down as the plunger 135 moves up and down.

In this way the cork is inserted in the lower end of the ampule so that the ampule may pass to station G and later to stations H and I. The stations G, H and I are similar and each station includes a receptacle 200 (Figs. 4 and 5) which communicates with a valve 201 on a pipe 202 which extends to a suitable source of liquid. By employing the three stations, G, H and I, and by manipulating the valves 201 I may introduce one or more liquids into the ampule as occasion demands.

Each of the receptacles 200 is provided with a partition 203 which has an aperture 204 therein controlled by a valve 205 which is pivoted at 206 and projects outwardly through a packing member 207 in the side wall of the receptacle. The valve includes an operating arm 208 which is adapted to be rocked by arms 209 on a wheel 210 which is mounted on a shaft 211.

Each of the shafts 211 is driven by a bevel gear 212 which meshes with the bevel gear 213 on a shaft 214. The shaft 214 is driven by a bevel gear 215 from a bevel gear 216. The gear 216 is mounted on a shaft 250 and the construction is such that as the shaft 250 rotates step by step the arms 209 will advance periodically and will trip the arms 208, thus periodically opening the valves 205 and permitting a quantity of liquid to pass into the lower portion 217 of the receptacle 200. Thus a desired quantity of liquid is run into the portion 217 at stated intervals. The lower portion of the receptacle 200 has a discharge opening 218 which is controlled by a valve 219, the latter being slidably mounted and having a depending arm 220. The valve 219 includes an aperture 221 which aligns with the opening 218 in one position of the valve. The arm 220 fits in a cam groove 222 in the table 75. The cam groove contains portions 223 which move the arm 220 inwardly and thereby move the valve 219 so that the apertures 218 and 221 are aligned. This movement of the valve 219 occurs when the ampule is just passing beneath the discharge opening 218 so that the charge of liquid from the receptacle portion 217 passes into the ampule.

This liquid discharge operation is carried on at one or more of the stations G, H and I so that the correct amount of liquid is inserted in the ampule before the ampule passes to station J.

At station J a piston stopper 225 is discharged from a hopper 226 onto the top of the ampule which has just been filled with liquid. The stopper 225 is removed from the hopper by arms 227 similar to the arms previously disclosed and mounted on pivots 228 and provided with segmental gears 229 so that when one arm is moved the other arm will be similarly moved.

The inner arm 227 has a depending portion 230 which fits in the cam groove 222 on the table 76. The portions 223 of the cam groove move the portion 230 of the arm inwardly, thus moving the arms 227 and causing a stopper to be dropped in the same manner as that previously described.

The piston stopper is moved into the ampule at station K, and the air in the upper end of the ampule is simultaneously exhausted. The apparatus which performs this function is shown in Figs. 22 and 23. The construction includes a cam member 231 similar to the cam member 137, previously described, and driven by a shaft 232 from a shaft 233 by gears 234. The shaft 233 is driven by a gear 235 from the gear 49. The shaft 232 is aligned with a plunger 236 which has a head 237 thereon. The plunger 236 includes a pin 238 (Fig. 23) which is engaged by the cam surfaces of the member 231 thus pushing the pin downwardly and pushing the plunger 236 so that the head 237 thereon pushes the stopper 225 into the ampule. The lower end of the plunger 236, as at 238', is reduced and sharpened and the plunger is hollow and is connected through a fitting 239 with the tube 240 which communicates with a vacuum pump. The fitting 239 includes a valve operated by an arm 241. As the plunger 236 moves downwardly the fitting 239 moves with it and the arm 241 hits a projection 242 on a stationary bracket 243 and thus the valve is opened. This occurs when the tip 238 has pierced the stopper 225. When the plunger 238 and the fitting 239 rise, a spring 244 pulls the arm 241 downwardly to close the valve.

After the piston cork has been placed in the ampule at station K the ampule moves to station L where it is removed from the table 76. This removal of the ampule is accomplished by arms 250 which are arranged on a hub 251. The hub 251 is driven by a gear 252 which is in turn driven by a gear 253 on a shaft 254. This shaft 254 is driven from the gear 216 previously mentioned by means of a gear 255.

Each of the arms 250 is provided with a hook portion 256 which moves as shown in Fig. 2 to engage and move the filled ampule from the recess in the table 76. The filled ampule passes into a chute 257 whence it passes to a packaging station not shown.

In Figs. 24 to 32 inclusive I show diagrammatically a modified apparatus and a modified method of loading containers.

In this modification the medicinal containing stopper compresses a tubular body 260 (Fig. 24). This stopper has a trap-door closure 261 at one end. In this stopper 260 a medicinal pellet 262 is placed (Fig. 25) and thereafter a closure 263 (Fig. 26) is inserted in the closure 260 and the latter is then placed in an ampule 264. In the other end of the ampule a piston closure 265 is inserted after the ampule has been filled with liquid.

In the modification a suitable support 270 (Fig. 24) having a recess 271 therein receives a stopper 260 from a hopper 272. In the next step (Fig. 25) a medicinal tablet 262 is delivered from a hopper 273 and in the next step (Fig. 26) the closure 263 is delivered from a hopper 274. In the next step (Figs. 27 and 28) the ampule 264 is arranged beneath the closure and a piston 275 having a reduced head 276 is employed. The head 276 pushes the disclosure 263 into place and thereafter the piston 275 pushes the closure 260 into the end of the ampule. The ampule 264 is then inverted and into the open upper end thereof liquid is run from the source of supply 277 (Fig. 29). The piston closure 265 is next inserted in the upper end of the ampule. This closure 265 is discharged from a hopper 280 (Fig. 30) into a recess 281 on a guide member 282. A plunger 283 (Fig. 31) then pushes the piston closure 265 into the ampule 264. The upper end of the ampule may be evacuated by the means shown at station K (Fig. 2) previously described while the piston cork is being inserted. The completed ampule is shown in Fig. 32.

In Figs. 33 to 44 inclusive I show diagrammatically a modified apparatus and a modified method of loading containers. In this modification the medicinal containing cork comprises a tubular stopper 290 which has an internal flange 291 at one end with an aperture 292 in the flange. In this stopper 290 I insert a disc 293, then a medicinal tablet 294 and then a second disc 295. The stopper containing the medicinal tablet is then placed in an ampule 296 and the ampule is filled and a piston cork 297 is inserted in the open end of the ampule.

In Fig. 33 I show a support member 300 having a recess 301 therein with a plunger 302 slidable in the bottom of the recess. A hopper 303 discharges the stoppers 290 into the recess 301. In Fig. 34 the next step is disclosed wherein a hopper 304 discharges the closure disc 293 which is later pushed into place by a plunger 305 (Fig. 35).

The medicinal tablet 294 is then discharged onto the closure disc 293 from a hopper 306 (Fig. 36). A hopper 307 discharges the second closure disc 295 (Fig. 37) onto the cork 290 and a plunger 308 (Fig. 38) pushes the closure 295 to place. The plunger 302 is then operated as shown in Figs. 39 and 40 to push the loaded closure 290 through a guide member 308′ and into the ampule 296. The ampule is then filled from a nozzle member 309 (Fig. 41) and thereafter a piston cork 297 (Fig. 42) is discharged from a hopper 310 into guide member 311 arranged above the upper end of the ampule 296. A plunger 312 (Fig. 43) then pushes the piston stopper 297 into the ampule and the ampule is completed as shown in Fig. 44.

In order to signal when the supply of pellets in the hopper 105 is becoming low I show means in Fig. 9A which affords a signal. As shown the hopper 105 which contains the pellets 106 is provided with aligned apertures 315. Adjacent one of the apertures I show an exciter lamp 316 and in the path of the light from the exciter lamp I show a photoelectric cell 317. The photoelectric cell when actuated by the exciter lamp 316 operates an electro-magnet 318 which serves to close a switch 319 and this closes a circuit 320 which includes a battery 321 and a bell 322. Thus when the supply of pellets in the hopper 105 is not sufficient to reach the apertures 315, the photoelectric cell 317 will be actuated, thus causing the bell 322 to sound an alarm.

From the foregoing description it will be apparent that I have invented a novel apparatus and method for filling containers which is compact, simple in construction and operation, and which is not apt to get out of order, and that by use of my invention containers of various types and adapted for various uses can be economically filled.

Having thus described my invention, I claim:

1. A container loading apparatus including a disc, means to rotate said disc step by step, said disc having a plurality of upwardly directed apertures therein, an upwardly movable plunger in each aperture, means to direct a hollow stopper into one of said apertures, means to deliver a pellet into the stopper in said one aperture, means to deliver a closure to the said one cavity, means to force the closure into the stopper, a second disc mounted adjacent said first disc, means to rotate the second disc step by step, said second disc having a plurality of ampule receiving cavities therein, means to deliver an ampule into an ampule cavity, said disc apertures and said ampule cavities being aligned when the discs assume different positions, means to operate said plunger to thereby force the stopper in the associated aperture into the ampule, means to inject fluid into the stoppered ampule, means to place a second stopper in the ampule, means to withdraw the air from the ampule as the second stopper is being placed in the ampule, and means to remove the loaded ampule from the ampule cavity.

2. A stopper loading apparatus including a disc, means to rotate said disc step by step, said disc having a plurality of upwardly directed apertures therein, an upwardly movable plunger in each aperture, a stopper containing hopper disposed in a path of said apertures, means to support the lowermost stopper in said hopper, means to release the lowermost stopper in said hopper when one of said apertures is below said hopper, a pellet hopper disposed in the path of said apertures, means to support the lowermost pellet in said pellet hopper, means to release the lowermost pellet in said pellet hopper when one of said apertures is beneath said pellet hopper, a closure hopper disposed in the path of said apertures, means to support the lowermost closure in said closure hopper, means to release the lowermost closure in said hopper when one of said apertures is below said closure hopper, means disposed in the path of said apertures to move said closure downwardly into the associated stopper when one of said apertures is below said moving means, and means to discharge the stopper from said one aperture.

3. A stopper loading apparatus including a disc, means to rotate said disc step by step, said disc having a plurality of upwardly directed apertures therein, an upwardly movable plunger in each aperture, a stopper containing hopper disposed in a path of said apertures, means to support the lowermost stopper in said hopper, means to release the lowermost stopper in said hopper when one of said apertures is below said hopper, a preparation hopper disposed in the path of said apertures, means to release preparation in said preparation hopper, when one of said apertures is beneath said preparation hopper, a closure hopper disposed in the path of said apertures, means to support the lowermost closure in said closure hopper, means to release the lowermost closure in said hopper when one of said apertures is below said closure hopper, means disposed in the path of said apertures to move said closure downwardly into the associated stopper when one of said apertures is below said moving means, and means to discharge the stopper from said one aperture.

4. A container loading apparatus including a disc, means to rotate said disc step by step, said disc having a plurality of upwardly directed apertures therein, an upwardly movable plunger in each aperture, a stopper hopper disposed in a path of said apertures, means to release a stopper from said stopper hopper when one of said apertures is below said stopper hopper, a pellet hopper disposed in the path of said apertures, means to release a pellet from said pellet hopper when one of said apertures is beneath said pellet hopper, a closure hopper disposed in the path of said apertures, means to extract a closure from said closure hopper when one of said apertures is below said closure hopper, and to place the extracted closure in a stopper in said one aperture, a second disc mounted adjacent said first disc and partially overlapping said first disc, means to rotate the second disc step by step, said second disc having a plurality of ampule receiving cavities therein, an ampule hopper, means to discharge an ample from the ampule hopper into an ampule cavity beneath the ampule hopper, said disc apertures and said ampule cavities being aligned when the discs assume different positions, means to move said upwardly movable plunger upwardly when said disc aperture and cavity are aligned to thereby force the stopper in the associated aperture into the ampule, means to insert fluid into the stoppered ampule, and means to place a second stopper in the ampule.

5. A container loading apparatus including a disc, means to rotate said disc step by step, said disc having upwardly directed apertures therein, a stopper hopper disposed in the path of said apertures, means to support the lowermost stopper in said hopper, means to release the lowermost stopper in said cork hopper when an aperture is below said cork hopper, a pellet hopper disposed in the path of said aperture, means to support the lowermost pellet in said pellet hopper, means to release the lowermost pellet in said pellet hopper when an aperture is beneath said pellet hopper, a closure hopper disposed in the path of said apertures, means to support the lowermost closure in said closure hopper, means to release the lowermost closure in said closure hopper when an aperture is below said closure hopper, a second disc mounted adjacent said first disc and partially overlapping said first disc, means to rotate the second disc step by step, said second disc having an ampule receiving cavity therein, an ampule hopper, means to hold ampules in said ampule hopper, means to discharge the lowermost ampule in the ampule hopper into the ampule cavity beneath the ampule hopper, said disc aperture and said ampule cavity being aligned, means to force the stopper in the associated aperture into the ampule, means to insert fluid into the stoppered ampule, means to place a second stopper in the ampule, and means to remove the loaded ampule from the ampule cavity.

6. A container loading apparatus including a disc, means to rotate said disc step by step, said disc having a plurality of upwardly directed apertures therein, an upwardly movable plunger in each aperture, a stopper hopper disposed in a path of said apertures, means to support the lowermost stopper in said hopper, means to release the lowermost stopper in said stopper hopper when one of said apertures is below said stopper hopper, a pellet hopper disposed in the path of said apertures, means to support the lowermost pellet in said pellet hopper, means to release the lowermost pellet in said pellet hopper when one of said apertures is beneath said pellet hopper, a closure hopper disposed in the path of said apertures, means to support the lowermost closure in said closure hopper, means to release the lowermost closure in said closure hopper when one of said apertures is below said closure hopper, a second disc mounted adjacent said first disc and partially overlapping said first disc, means to rotate the second disc step by step, said second disc having a plurality of ampule receiving cavities therein, an ampule hopper, means to hold ampule in said ampule hopper, means to discharge the lowermost ampule in the ampule hopper into an ampule cavity beneath the ampule hopper, said disc apertures and said ampule cavities being aligned when the discs assume different positions, means to move said upwardly movable plunger upwardly when said disc aperture and cavity are aligned to thereby force the stopper in the associated aperture into the ampule, means to insert fluid into the stoppered ampule, means to place a second stopper in the ampule, means to withdraw air from the ampule as the stopper is being placed in the ampule, and means to remove the loaded ampule from the ampule cavity.

7. The steps in the method of loading a container which comprise taking a member having a cavity therein and inserting a hollow stopper in the cavity while the member is in one position, moving the member to a second position and inserting a preparation into the hollow stopper while the member is in the second position, moving the member to a third position and inserting a closure in the cavity while the member is in the third position, moving the member to a fourth position and moving the closure into the stopper while the member is in the fourth position and thereafter discharging the stopper from the cavity.

8. The method of loading a container, comprising taking a member having a cavity therein, inserting a hollow stopper which has a closure at one end into the cavity, moving the member to a second position and inserting a preparation in the hollow stopper while the member is in the second position, again moving the member to a third position and inserting a closure in the cavity while the member is in the third position, moving the member to a fourth position and moving the second closure into the stopper cavity while the member is in the fourth position, moving the member to a fifth position and supporting an ampule over the cavity and forcing the stopper out of the cavity into one end of the ampule while the member is in a fifth position, moving the ampule, inserting a liquid in the ampule, moving the liquid containing ampule to still another position, and thereafter placing a second stopper in the other end of the ampule while in the other position.

9. The method of loading a stopper, comprising taking a member having a cavity therein and inserting a hollow stopper having a trapdoor closure in one end thereof, in the cavity while the member is in one position, moving the member to a second position and inserting a preparation into the hollow stopper while the member is in the second position, moving the member to a third position and inserting a closure in the cavity while the member is in the third position, moving the member to a fourth position and moving the closure into the other end of the stopper while the member is in the fourth position and thereafter discharging the stopper from the cavity.

10. The method of loading a container, comprising taking a member having a cavity therein, inserting a hollow stopper in the cavity, moving the member to a second position and inserting a tablet in the hollow stopper while the member is in the second position, moving the member to a third position and inserting a closure in the cavity while the member is in the third position moving the member to a fourth position and moving the closure into the stopper while the member is in the fourth position, moving the member to a fifth position, supporting an ampule over the cavity and forcing the stopper out of the cavity into one end of the ampule while the parts are in fifth position, turning the ampule over so that the inserted stopper is at the bottom of the ampule, thereafter inserting a liquid in the ampule, moving the liquid containing ampule, and thereafter placing a second cork in the other end of the ampule.

11. The method of loading a container, comprising taking a member having a cavity therein, inserting a hollow stopper in the cavity, moving the member to a second position and inserting a closure in the cavity, moving the member to a third position and moving the closure into one end of the stopper, moving the member to a fourth position and inserting a preparation into the hollow stopper, moving the member to a fifth position and inserting a second closure in the cavity moving the member to a sixth position and moving the second closure into the stopper, moving the member to a seventh position and supporting an ampule over the cavity and forcing the stopper in the cavity into the ampule while the parts are in the seventh position, thereafter moving the ampule to an eighth position and placing a liquid in the ampule, moving the filled ampule to a ninth position, and thereafter placing a second cork in the ampule.

12. The method of loading a container which comprises placing a hollow stopper on a support, moving the support to another location and at said location inserting a preparation in the hollow stopper, moving said support to another location and at this location inserting a closure in the hollow stopper, to seal the preparation in said hollow stopper, supporting an ampule in alignment with the stopper and moving the stopper into one end of the ampule, moving the ampule to a location and at this location inserting a liquid in the ampule, and thereafter placing a cork in the other end of the ampule.

13. The method of loading a container, which comprises placing a hollow stopper on a support, moving the support to another location and at said location inserting a tablet into the hollow stopper, moving the support to another location and at this location inserting a closure in the stopper, supporting an ampule and forcing the stopper into one end of the ampule, inverting the ampule and inserting a liquid in the open end of the ampule, moving the ampule to another location, and at this location placing a cork in the open end of the ampule.

14. The method of loading a container, comprising placing a hollow stopper on a support, moving said support to a location and at said location inserting a closure into one end of the stopper, moving the support to another location and at this location inserting a preparation in the hollow stopper, moving the support to another location and at this location inserting a second closure in the other end of the hollow stopper, supporting an ampule, inserting the stopper in one end of the ampule, inverting the ampule and inserting a liquid in the ampule, and thereafter placing a stopper in the other end of the ampule.

15. A container loading apparatus including a movable support member, means disposed in the path of said movable support to insert a preparation into a stopper on the support member, means disposed in the path of said movable support to insert a closure in one end of the stopper, means positioned adjacent said movable support to support an ampule, means associated with said movable support to move the stopper into the ampule, and means to thereafter insert a second stopper in the other end of the ampule.

16. In a container loading apparatus, a movable support member, means disposed in the path of said member to support a hollow stopper having a closure at one end on the member, means disposed in the path of said member to insert a preparation into the stopper, means disposed in the path of said member to move a closure to sealing position in the stopper, means positioned adjacent said member to support an ampule, means to insert the stopper into one end of the ampule, and means to place fluid in the ampule.

17. In a container loading apparatus, a movable member having a cavity therein, means disposed in the path of said member to insert a hollow stopper having a closure at one end into the cavity, means disposed in the path of said member to insert a preparation into the stopper in the cavity, means disposed in the path of said member to insert a closure into the stopper, means positioned adjacent said member to support an ampule, means to insert the stopper into one end of the ampule, means to place fluid in the ampule and means to thereafter insert a second stopper in the other end of the ampule and to simultaneously evacuate the other end of the ampule.

18. In a container loading apparatus including a member having a cavity therein, said member being movably mounted, means disposed in the path of said member to insert a hollow stopper into the cavity, means disposed in the path of said member to insert a preparation into the stopper in the cavity, means disposed in the path of said member to insert a closure in the cavity, means disposed in the path of said member to move the inserted closure into the stopper, means positioned adjacent said member to support an ampule, and means associated with said member to move the stopper out of the cavity and to insert the stopper into one end of the ampule.

19. A container loading apparatus including a member having a cavity therein, said member being movably mounted, means disposed in the path of said member to insert a hollow stopper into the cavity, means disposed in the path of said member to insert a preparation into the stopper in the cavity, means disposed in the path of said member to insert a closure in the cavity, means disposed in the path of said member to move the inserted closure into the stopper, means positioned adjacent said member to support an ampule, means associated with said member to move the stopper out of the cavity and to insert the stopper into one end of the ampule, and means to thereafter insert a second stopper in the other end of the ampule.

20. A container loading apparatus, including a support, means to direct a hollow stopper to said support, means disposed in the path of said support to deliver a prepration into the stopper on said support, means disposed in the path of said support to deliver a closure to said stopper, means disposed in the path of said support to force the closure into the stopper, a second support mounted adjacent said first support, said second support having an ampule receiving station, means to deliver an ampule to the ampule receiving station, said supports adapted to be moved to positions so that the stopper on said first support is aligned with the ampule receiving station, means to force the stopper into the aligned ampule, means to introduce fluid into the stoppered ampule, and means to place a second stopper in the ampule.

21. In a container loading apparatus, a support, means to move said support step by step, said support having a plurality of stopper receiving stations therein, means disposed in the path of said support to direct a hollow stopper to one of said stations, a second support mounted adjacent said first support, means to move said second support, said second support having a plurality of ampule supporting stations, means to deliver an ampule into an ampule supporting station, said supports adapted to be moved to positions so that the stopper receiving stations of said first support are aligned with the ampule supporting station of said second support, means to force the stopper in the stopper receiving station into one end of the ampule, in the aligned ampule supporting station, means to place fluid in the ampule and means to place a stopper in the other end of the ampule.

22. A container loading apparatus including a support member, means to move said member step by step, said member having a stopper receiving station, means disposed in the path of said support member to direct a hollow stopper to said station, means disposed in the path of said support member to deliver a preparation to the stopper, means disposed in the path of said support member to place a closure on the stopper, a second support member mounted adjacent said first support member, means to move the second support member step by step, said second support member having an ampule receiving station thereon, means to deliver an ampule to said ampule station, said support members adapted to be moved to positions so that the stopper receiving station of said first support member is aligned with the ampule receiving station of said second support member, and means to force a stopper at the stopper receiving station into an ampule at the aligned ampule receiving station.

23. A container loading apparatus including a support member, means to move said member step by step, said member having a stopper receiving station, means disposed in the path of said support member to direct a hollow stopper to said station, means disposed in the path of said support member to deliver a preparation to the stopper, means disposed in the path of said support member to place a closure on the stopper, a second support member partially overlapping said first support member, means to move the second support member step by step, said second support member having an ampule receiving station thereon, means to deliver an ampule to said ampule station, said support members adapted to be moved to positions so that the stopper receiving station of said first support member is aligned with the ampule receiving station of said second support member, and means to force a stopper at the stopper receiving station into an ampule at the aligned ampule receiving station.

24. A container loading apparatus including a disc, means to rotate said disc step by step, said disc having a plurality of upwardly directed apertures therein, means disposed in the path of said disc to direct a hollow stopper into one of said apertures, means disposed in the path of said disc to deliver a closure to the said one aperture, means disposed in the path of said disc to force the closure into the stopper, a second disc partially overlapping said first disc, means to rotate the second disc step by step, said second disc having a plurality of ampule receiving stations thereon, means to deliver an ampule into an ampule station, said discs adapted to be rotated to positions so that the apertures of said first disc are aligned with the ampule receiving stations of said second disc, and means to force the stopper in the aperture aligned with the ampule receiving station into the ampule therein.

25. A container loading apparatus including a disc, means to rotate said disc step by step, said disc having a plurality of stopper receiving stations therein, means disposed in the path of said disc to direct a hollow stopper to one of said stations, means disposed in the path of said disc to deliver a preparation into the stopper in said one station, means disposed in the path of said disc to deliver a closure to the said one station, means disposed in the path of said disc to force the closure into the stopper, a second disc mounted adjacent said first disc, means to rotate the second disc step by step, said second disc having a plurality of ampule supporting stations, means to deliver an ampule into an ampule supporting station, said discs adapted to be rotated to positions so that stopper receiving stations of said first disc are aligned with ampule supporting stations of said second disc, means to force the stopper in the stopper receiving station aligned with the ampule supporting station into one end of the ampule therein, means to place fluid in the ampule and means to place a stopper in the other end of the ampule.

26. A container loading apparatus including a movable support, means to move said support step by step, said support having a stopper receiving station thereon, a stopper containing hopper, disposed in the path of said station, means to extract a stopper from said stopper hopper and to place the extracted stopper in said station when said station is below said hopper, a preparation hopper, disposed in the path of said station, means to discharge preparation from said preparation hopper into said stopper, when said stopper on said station is below said hopper, means to extract a closure from said closure hopper, means to move an extracted closure into a stopper, when said stopper on said station is below said hopper, another support adjacent said stopper receiving support and adapted to hold an ampule, means in the stopper receiving station to move the stopper thereon into one end of the supported ampule, means to place fluid in the ampule and means to place a stopper in the other end of the ampule.

ARTHUR E. SMITH.